Aug. 4, 1953

T. O. KOSATKA 2,647,777

ONE-PIECE SEALING DEVICE

Filed Feb. 9, 1949

INVENTOR.
Thomas O. Kosatka,
BY

Aug. 4, 1953 T. O. KOSATKA 2,647,777
ONE-PIECE SEALING DEVICE
Filed Feb. 9, 1949 2 Sheets-Sheet 2
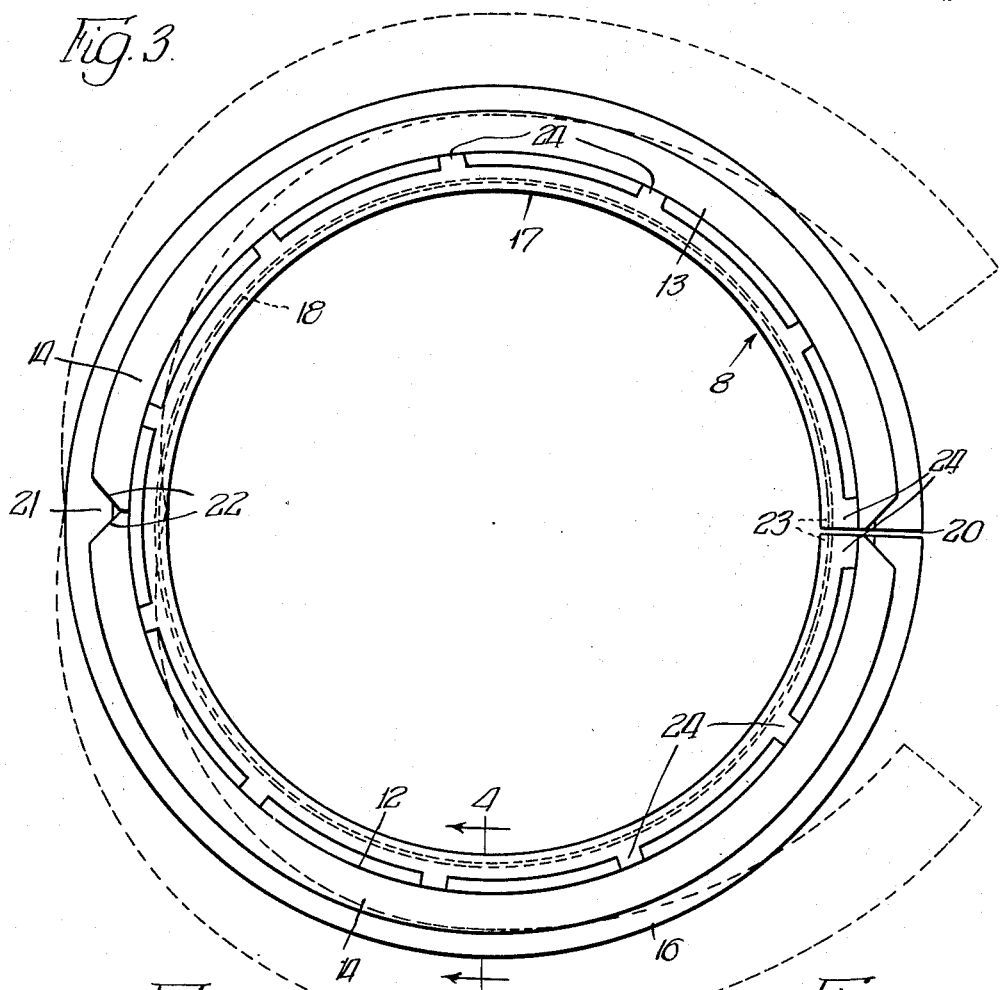
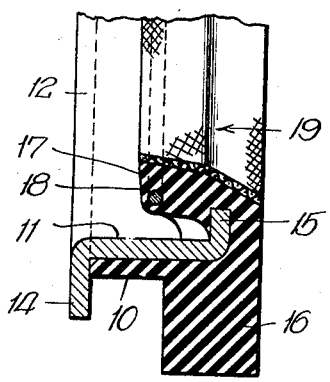
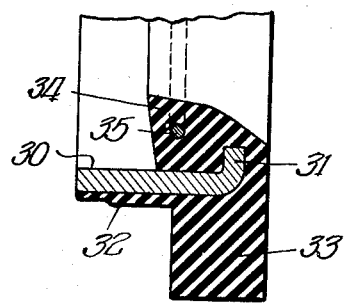
INVENTOR.
Thomas O. Kosatka, Patented Aug. 4, 1953

2,647,777

UNITED STATES PATENT OFFICE 2,647,777

ONE-PIECE SEALING DEVICE

Thomas O. Kosatka, Chicago, Ill., assignor to Victor Manufacturing & Gasket Co., Chicago, Ill., a corporation of Illinois Application February 9, 1949, Serial No. 75,464

2 Claims. (Cl. 288—2)

This invention relates to one-piece sealing devices for forming a fluid-tight seal in the space between a pair of housing members, that fit together and define an opening through which a shaft projects, and the shaft, and has for its principal object the provision of a new and improved sealing device of this kind.

It is a main object of the invention to provide a one-piece sealing device that can be threaded around a shaft and into engagement with a housing member through which the shaft projects, even though the projecting end of the shaft contains a flange that prevents threading the seal on the shaft solely by movement longitudinally thereof.

Another object of the invention is to provide a one-piece fluid sealing device for the rear main bearing of a combustion engine.

Still another object of the invention is to provide a one-piece fluid sealing device that can be used as a replacement item on existing engines as well as standard equipment on new engines.

Another object of the invention is to provide a one-piece sealing device that is supported solely by the housing that it engages and does not require the use of bolts or screws to hold it in place.

Another object of the invention is to provide a one-piece sealing device that can be manufactured and installed at low cost without sacrificing quality.

Further objects of the invention not specifically mentioned here will be apparent from the detailed description and claims which follow, reference being had to the accompanying drawings in which a preferred embodiment of the invention is shown by way of example and in which Fig. 1 is a fragmentary elevational view of an internal combustion engine showing the seal of the present invention applied thereto;

Fig. 3 is a plan view of the sealing device in closed position, with the partially open position indicated in dotted lines;

Fig. 4 is a cross-sectional view taken substantially along the line 4—4 of Fig. 3, looking in the direction of the arrows and drawn to an enlarged scale; and Fig. 5 is a view similar to Fig. 4, showing a modified form of sealing device.

Figure 1:
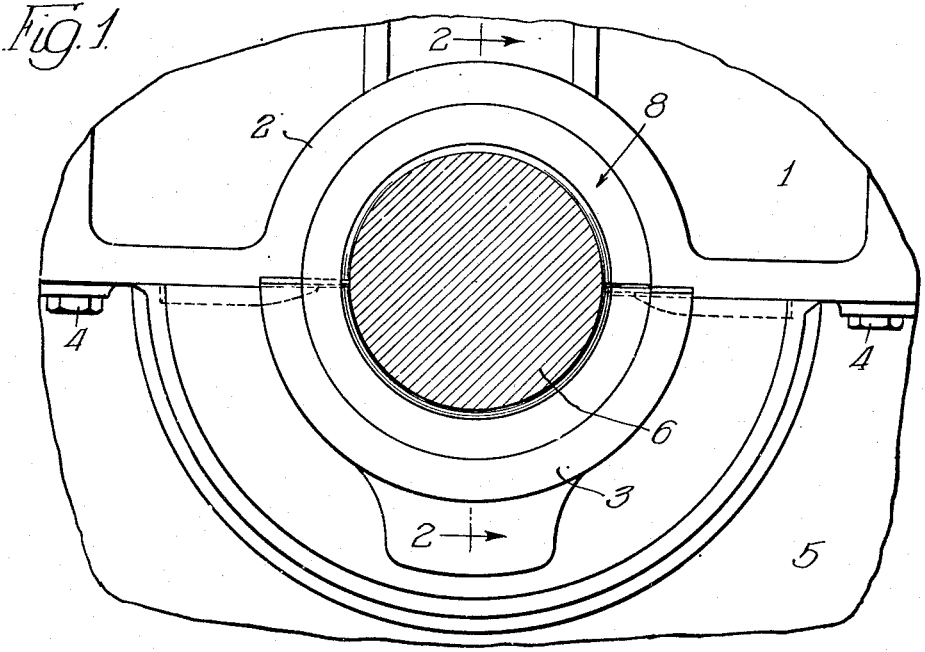

In many instances where shafts are projected out of a relatively stationary housing, flanges or other devices on the projecting end of the shaft prevent the use of a solid circular seal to render fluid-tight the space between the shaft and housing through which it projects. Thus, for example, the crankshaft of an internal combustion engine projects out of the crankcase and is flanged to receive the flywheel of the engine. In most instances heretofore, under these circumstances, the space between the shaft and the housing has been sealed by two-piece seals which fit together in such a manner to to form a fluid-tight joint. In certain instances, these sealing devices have been attached to the housing by bolts or screws, and in other instances the seals have been supported solely by their frictional engagement with the housing part upon which they are mounted and their engagement with the shaft. It is to seals of the latter type that the present invention particularly relates.

Although sealing devices of the self-supporting type and formed of two complementary members adequately and satisfactorily seal the space between the housing and shaft in certain instances, particularly in the construction of new engines, one-piece sealing devices are strongly preferred. The present invention provides such a device which is possessed of many distinct improvements and advantages over the one-piece sealing devices of the prior art of which I am aware.

In its preferred form, the sealing device of the present invention consists of a one-piece ring-like structure formed of an elastomer that is impervious to the fluids with which the device is likely to come into contact. Incorporated in this one-piece structure are flanged metallic reinforcing members which are exceedingly rigid and are shaped to conform to the contour of the opening into which the sealing device is adapted to fit. The elastomer is bonded to the metallic reinforcing members and partially encompasses these members, the elastomer being shaped in the form of a relatively thin, cylindrical wall backed up by the rigid metallic reinforcing member so that as the housing members are moved into final position a main seal between the housing and device is formed by compression of the thin wall section of elastomer between the rigid housing member and the rigid reinforcing member. To facilitate opening the sealing device to permit it to be threaded around the shaft and into engagement with the housing member, the elastomer ring is interrupted at one of the junctions between the two complementary reinforcing members and continued across the other junction, forming in effect a hinge having sufficient movement to permit proper registration of the device with the shaft and housing.

The elastomer ring contains an inwardly projecting flangelike portion shaped to form a sealing lip that tightly engages the shaft to form a fluid-tight connection therewith. If desired, the shaft-engaging lip may be reinforced by having embedded in it a springlike material such as a piece of piano wire shaped to form a circle and disposed with its abutting ends in alignment with the interruption in the elastomer and coinciding with the junction of the reinforcing member. If desired, the shaft-engaging portion of the lip may be surfaced with a suitable fabric to reduce the coefficient of friction between the elastomer and shaft, as is customary in the art.

Figure 2:
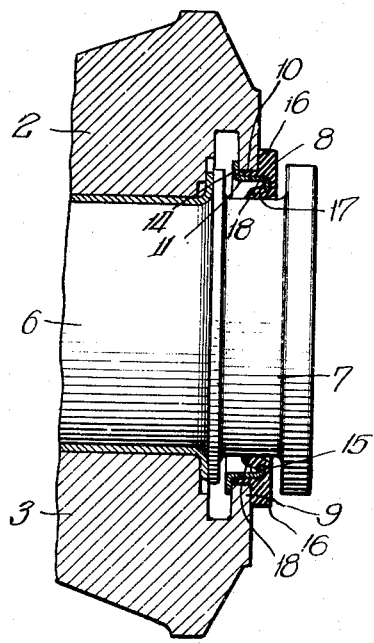
Fig. 2 is a fragmentary cross-sectional view taken substantially along the line 2—2 of Fig. 1, looking in the direction of the arrows.

Referring now to the drawings in more detail, particularly Figs. 1 and 2, wherein there is shown a fragmentary portion of a rear end of an internal combustion engine comprising a main crankcase 1 that contains in it the upper half 2 of the rear main bearing, the lower half 3 of this bearing registering therewith and being secured to the crankcase by bolts, not shown. Surrounding the main bearings 3 and secured to the crankcase by studs 4 is the pan 5 which forms no part of the present invention. The shaft 6 supported by the rear bearing members 2 and 3 projects out of these members and carries a flange 7, Fig. 2, to which the flywheel of the engine is attached.

The sealing device 8 fits upon and is supported by the flangelike projections 9 on the bearing members 2 and 3, which projections together form a circular opening having a diameter substantially greater than the diameter of the shaft.

As will be seen in Figs. 3 and 4, in its preferred form the sealing device 8 consists of a ringlike body of elastomer having a thin wall cylindrical section 10 bonded to the outside surface of the cylindrical portions 11 of a pair of metallic semicircular rings 12 and 13 which are butted together to define a reinforcing ring for the elastomer. As will be seen best in Fig. 4, each of the metallic rings 12 and 13 is of generally Z-section, having an outwardly extending flange 14 and an inwardly projecting and somewhat shorter flange 15 at opposite ends of the central cylindrical wall section 11.

At the end of the cylindrical section 10 of the elastomer adjacent the inwardly extending flange 15 there is formed in the elastomer an outwardly extending flangelike portion 16 which, with the flange 14 and cylindrical wall section 10, forms an outwardly opening groove that encircles the device. Projecting inwardly from the flange 15 is a shaft-engaging lip 17 which may be reinforced with a piano wire ring 18 and may contain a fabric facing 19, if desired.

The outside diameter of the thin cylindrical section 10 of the elastomer is preferably slightly greater than the inside diameter of the opening in the crankcase formed by the complementary main bearing members, and the inside diameter of the lip 17 is preferably slightly less than the diameter of the shaft so that when the bearing members are drawn together, as will presently appear, the thin wall and lip sections of the elastomer are compressed to form fluid-tight seals.

The metallic ring members 12 and 13 being butted together form between them a flanged ring, having two junction lines. The elastomer is interrupted at one of these junctions, as indicated at 20 (Fig. 3), and extended across the other junction, as indicated at 21. In this manner the two metallic reinforcing members are effectively hinged together. In order to permit the metallic members to be spread apart, thereby to open the sealing device and permit it to be threaded over a shaft, flanges 14 are beveled, as shown at 22. In instances where a piano wire 18 is embedded in the lip section 17 of the device, the junction of this wire will coincide with the junction of the metallic members and interruption 20 in the elastomer ring, as indicated at 23.

It is common practice in seals of this kind to provide reinforcing ribs 24 that project out of the back face of the sealing lip 17 and extend to and are bonded on the reinforcing members 12 and 13. These ribs stiffen the lip 18 and also serve to position it with respect to the reinforcing members. At the junction 20 in the elastomer, two ribs 24 are placed side by side and serve to definitely position the lip and ends of the wire 18 with respect to the reinforcing members.

This arrangement permits the sealing device to be opened, as indicated in dotted lines in Fig. 3, to permit it to be threaded around the shaft and into engagement with the flangelike wall 9 of the upper main bearing that defines the opening into which the device is fitted. After the sealing device has been so registered with the upper main bearing, the lower main bearing can be fitted on and engaged with the bottom half of the sealing device preparatory to drawing the bearing members together thereby to form the seal.

Manufacturing tolerances will result in an appreciable variation in the thickness of the flangelike walls 9 of the bearing members. The metallic flange 14 engages the inner surfaces of these walls and the elastomer flangelike section 16 engages the outer surfaces thereof. The distance between the flanges 14 and 16 is made to be the same as the minimum thickness of the wall section likely to be encountered; and when this wall is thicker than this minimum, the elastomer flange 16 is compressed somewhat as the sealing device is registered therewith. Since the outer diameter of the cylindrical section 10 of the elastomer is slightly greater than the inner diameter of the opening defined by the walls 9, as the bearing members are drawn together in final position this cylindrical section of the elastomer will be compressed between the rigid unyielding walls of the bearing parts and the rigid cylindrical wall of the metallic reinforcing rings. A fluid-tight seal will thus be formed. The pressure placed upon the elastomer wall 10 by the bearing members, and pressure placed against wall 9 by the elastomer flange 16, will support the sealing member and lock it against a tendency to rotate due to the torque placed on the shaft-engaging lip 17 by a rotation of the shaft, and the seal thus formed has been found to be capable of maintaining fluid-tight connection between the crankcase and the shaft for a long period of time. Preferably, this seal is completed by the addition of auxiliary elastomer sealing members fitting between the abutting faces of the bearing members 2 and 3, which sealing members are more fully shown and described in my co-pending application, Serial No. 739,899, filed April 7, 1947, now Patent No. 2,558,183, issued June 26, 1951.

In the embodiment of the invention shown in Figs. 3 and 4, the sealing device is held firmly against movement longitudinally of the shaft by the joint action of flanges 14 and 16, and must be threaded by movement around the axis of the shaft and into engagement with the stationary half of the wall 9. In certain instances it may be advantageous to provide a seal which can be threaded around the shaft and then moved longitudinally of the shaft into engagement with the wall of the housing member. Such a device is shown in Fig. 5.

In this modification, the metallic semi-circular rings 30 have a cylindrical section and an inwardly extending flange 31. The elastomer ring has a cylindrical portion 32, a radial flangelike portion 33 projecting outwardly therefrom, and a lip section 34 projecting inwardly therefrom, in which lip section a reinforcing piano wire 35 may be incorporated if desired. The elastomer is interrupted at one junction of the metallic rings and continued across the other junction to hinge the two other members together as before. The structure may be opened, threaded around the shaft, and then moved longitudinally into engagement with the housing opening where it is held solely by the frictional engagement of the housing members on the cylindrical section 32 of the elastomer. As the housing members are drawn together, this thin wall section 32 is compressed against the metallic ring, the abutting ends of which enable the hoop strength of the ring sections to resist distortion and a fluid-tight seal is thus formed as before.

The device of the present invention is a one-piece sealing device capable of being opened and threaded around the shaft and into engagement with housing members and to form a fluid-tight seal with those members and the shaft as the members are drawn together in final position. The metallic reinforcing members, being flanged, are much stiffer than the reinforcing members of the prior art of which I am aware, and as a result a higher unit compression can be placed on the sealing device. This results in a tighter seal and in securely locking the device against being rotated in the housing by torque placed upon it by the rotary shaft. The seal thus formed is maintained by the device over a long period of time without deterioration. The device can be cheaply manufactured without sacrificing quality and readily and cheaply applied to the engine without the use of special tools or equipment.

Throughout the foregoing description, we have referred to the device as applied to an internal combustion engine, this being one of the many applications to which the device can be put. This specific embodiment has been described by way of example and the precise structure of the device shown and described has likewise been described by way of example, as there are many modifications and adaptations which can be made by one skilled in the art, within the teachings of the invention.

Having thus complied with the statutes and shown and described a preferred embodiment of my invention, what I consider new and desire to have protected by Letters Patent is pointed out in the appended claims.

What I claim is:

1. A device for sealing the space between a shaft and a two-piece housing through which the shaft projects with its axis in the plane of parting of the housing, comprising: a one-piece elastomer ring comprising a cylindrical portion, a flange portion containing a radial face, and a lip portion projecting radially inwardly from said flange portion and terminating in a lip adapted to engage the shaft, and a pair of semi-circular reinforcing members each comprising a cylindrical portion to the outer face of which the cylindrical portion of said elastomer is bonded, and an integral radial portion disposed at one end of said cylindrical portion of said reinforcing members and having an inner face spaced from and in a plane parallel to said flange, forming therewith a groove that opens outwardly of the device, said reinforcing members being disposed in end to end abutment to form a ring and said elastomer being interrupted at one of the junctions of said members to permit the elastomer ring to be opened and threaded over the shaft and into engagement with one of the housing parts.

2. A device for sealing the space between a shaft and a two-piece housing through which the shaft projects with its axis in the plane of parting of the housing, comprising: a pair of reinforcing members each comprising a semi-cylindrical portion, a flange extending radially outwardly from one end of said portion and a second flange extending radially inwardly from the other end of said portion; an elastomer ring comprising a cylindrical portion bonded to the outer surface of the reinforcing member and adapted to be compressed between the reinforcing member and housing to form a seal between the housing and reinforcing member, a flange member encompassing said second flange and having a radial face extending outwardly and forming with said first flange an outwardly opening groove into which the housing pieces extend, and a lip member extending inwardly from said flange member and terminating in a sealing lip adapted to engage a shaft and form a seal therewith, said reinforcements being disposed in end to end abutment and said elastomer ring being interrupted at at least one of the abutments of said reinforcements to permit the ring to be opened and threaded over the shaft.

THOMAS O. KOSATKA.

References Cited in the file of this patent

UNITED STATES PATENTS

| Number | Name | Date |
|---|---|---|
| 1,525,582 | Hosmer | Feb. 10, 1925 |
| 2,069,212 | Buffington | Feb. 2, 1937 |
| 2,437,900 | Winkeljohn | Mar. 16, 1948 |
| 2,480,116 | Brummer | Aug. 30, 1949 |
| 2,558,183 | Kosatka | June 26, 1951 |